US007607228B2

(12) United States Patent
Mita

(10) Patent No.: US 7,607,228 B2
(45) Date of Patent: Oct. 27, 2009

(54) METHOD OF MANUFACTURING LIQUID EJECTION HEAD

(75) Inventor: Tsuyoshi Mita, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 350 days.

(21) Appl. No.: 11/362,946

(22) Filed: Feb. 28, 2006

(65) Prior Publication Data

US 2006/0197261 A1 Sep. 7, 2006

(30) Foreign Application Priority Data

Mar. 1, 2005 (JP) ............................ 2005-056450

(51) Int. Cl.
*B23P 17/00* (2006.01)
*B41J 2/045* (2006.01)

(52) U.S. Cl. ...................... 29/890.1; 29/25.35; 29/830; 29/831; 29/832; 347/68

(58) Field of Classification Search ................ 29/890.1, 29/830, 831, 832, 25.35; 216/27; 347/68–70, 347/71; 264/510, 650; 310/328, 331, 345, 310/324

See application file for complete search history.

(56) References Cited

U.S. PATENT DOCUMENTS

| | | | | |
|---|---|---|---|---|
| 5,006,058 | A * | 4/1991 | Maruyama et al. | 425/556 |
| 6,088,893 | A * | 7/2000 | Takeuchi et al. | 29/25.35 |
| 6,211,606 | B1 * | 4/2001 | Kanda et al. | 310/328 |
| 6,494,566 | B1 * | 12/2002 | Kishino et al. | 347/70 |
| 6,561,634 | B1 | 5/2003 | Nishiawa | |
| 6,666,943 | B2 | 12/2003 | Wada et al. | |
| 2002/0189099 | A1 | 12/2002 | Nishikawa | |

FOREIGN PATENT DOCUMENTS

| | | | |
|---|---|---|---|
| JP | 7-171966 | A | 7/1995 |
| JP | 2000-79686 | A | 3/2000 |
| JP | 3171213 | B2 | 3/2001 |
| JP | 2002-237626 | A | 8/2002 |
| JP | 2003-309303 | A | 10/2003 |
| JP | 2004-209740 | A | 7/2004 |
| JP | 2004-230778 | A | 8/2004 |

* cited by examiner

*Primary Examiner*—Derris H Banks
*Assistant Examiner*—Tai Nguyen
(74) *Attorney, Agent, or Firm*—Birch, Stewart, Kolasch & Birch, LLP

(57) ABSTRACT

The method manufactures a liquid ejection head in which piezoelectric bodies are formed on a diaphragm which constitutes walls of a plurality of pressure chambers. The method comprises the steps of: filling piezoelectric material into a plurality of recess sections of a molding substrate formed with the plurality of recess sections so as to correspond to the pressure chambers; then performing a lamination step of arranging a first green sheet that is to form the diaphragm onto the molding substrate in such a manner that the first green sheet covers the recess sections filled with the piezoelectric material; then performing a first heating step of heating the piezoelectric material filled in the recess sections; and then separating the piezoelectric material from the molding substrate.

10 Claims, 6 Drawing Sheets

METHOD OF MANUFACTURING LIQUID EJECTION HEAD

BACKGROUND OF THE INVENTION

1. Field of the Invention

The present invention relates to a method of manufacturing a liquid ejection head, and more particularly, to a method of manufacturing a piezoelectric type liquid ejection head.

2. Description of the Related Art

There are image forming apparatuses, such as inkjet printers, which employ a piezoelectric type print head (liquid ejection head) that uses the displacement of piezoelectric elements. As a structure for a piezoelectric element, for example, a common electrode is formed on the whole surface of a diaphragm which constitutes the upper surface of a plurality of pressure chambers, and piezoelectric bodies and individual electrodes are formed to overlap each other on the common electrode at positions corresponding to the pressure chambers. When a voltage is applied to a piezoelectric element, the piezoelectric body is displaced due to a lateral piezoelectric effect, and the volume of the pressure chamber changes through the diaphragm, the ink accommodated in the pressure chamber is pressurized, and an ink droplet is ejected from the nozzle connected to the pressure chamber.

In a piezoelectric type print head of this kind, in order to improve the energy conversion efficiency when converting the electrical energy applied to the piezoelectric elements into the kinetic energy of the ink droplets when ink is ejected, it is important that the diaphragm is thin, having approximately the same thickness as the piezoelectric bodies. However, if the diaphragm is formed to a thin dimension, then the strength of the diaphragm declines so that it becomes difficult to form the piezoelectric bodies directly onto the diaphragm.

Therefore, methods have been proposed in which piezoelectric bodies, and the like, are formed on a transfer substrate which is different to the diaphragm, whereupon the piezoelectric bodies, and the like, formed on the transfer substrate are transferred to the diaphragm (see, for example, Japanese Patent Application Publication Nos. 2003-309303, 2002-237626, and 7-17196).

Japanese Patent Application Publication No. 2003-309303 discloses a method in which a porous layer and electrodes (individual electrodes) are formed on a transfer substrate (intermediate transfer body), a patterned piezoelectric film is formed thereon, then the piezoelectric film and a diaphragm are bonded together through a bonding layer made of metal or the like (common electrode), and the porous layer is broken so that the transfer substrate is peeled away from the electrodes and the piezoelectric film.

Japanese Patent Application Publication No. 2002-237626 discloses a method in which a noble metal film, a lift-off layer, a first electrode film, a transfer film having piezoelectric properties, and a second electrode are formed, in sequence, on a transfer substrate (first substrate), whereupon a diaphragm is bonded onto the second electrode, the lift-off layer is etched using an etchant so that the transfer substrate is peeled away, and the transfer film is transferred onto the diaphragm.

Japanese Patent Application Publication No. 7-171966 discloses a method in which a piezoelectric material is screen-printed onto a transfer substrate, the material is heated and calcined to form piezoelectric bodies on the transfer substrate, a common electrode is formed on a head substrate, piezoelectric material is printed or applied thinly onto the common electrode, the piezoelectric bodies are made to adhere closely to the piezoelectric material on the common electrode so as to correspond to the positions of pressure chambers, and then calcined, whereupon the transfer substrate is peeled away. Furthermore, Japanese Patent Application Publication No. 7-171966 discloses, as separate modes, a method which uses a piezoelectric material mixed with metallic powder instead of the common electrode formed on the head substrate, a method which uses an epoxy resin or low-melting-point glass instead of the piezoelectric material formed on the common electrode, or a method which interposes individual electrodes between the transfer substrate and the piezoelectric bodies when forming the piezoelectric bodies onto the transfer substrate.

In a process of patterning piezoelectric bodies onto a flat transfer substrate so as to correspond to the shape of the pressure chambers, as in the methods disclosed in Japanese Patent Application Publication Nos. 2003-309303, 2002-237626 and 7-171966, a method is used which forms a solid film and then divides the film into individual films by etching, sandblasting, or the like, or a method based on screen printing is used. However, in the former method, it is necessary to repeat the step of division each time a print head is manufactured, and hence there is a risk that variation may occur in the shape of the piezoelectric bodies, and furthermore, an increase in manufacturing costs results. Moreover, in the latter method, there is a risk that variation may occur in the thickness of the piezoelectric bodies.

Furthermore, if an epoxy resin or low-melting-point glass is used to bond together the piezoelectric material and the common electrode, as described in Japanese Patent Application Publication No. 7-171966, then there is no bonding stability, the electric field applied to the piezoelectric bodies declines because an insulating material is inserted between the piezoelectric bodies and the common electrode, and the displacement of the piezoelectric bodies falls.

SUMMARY OF THE INVENTION

The present invention has been contrived in view of the aforementioned circumstances, an object thereof being to provide a method of manufacturing a liquid ejection head whereby manufacturing costs can be reduced, without irregularities in the thickness of the piezoelectric bodies.

In order to attain the aforementioned object, the present invention is directed to a method of manufacturing a liquid ejection head in which piezoelectric bodies are formed on a diaphragm which constitutes walls of a plurality of pressure chambers, the method comprising the steps of: filling piezoelectric material into a plurality of recess sections of a molding substrate formed with the plurality of recess sections so as to correspond to the pressure chambers; then performing a lamination step of arranging a first green sheet that is to form the diaphragm onto the molding substrate in such a manner that the first green sheet covers the recess sections filled with the piezoelectric material; then performing a first heating step of heating the piezoelectric material filled in the recess sections; and then separating the piezoelectric material from the molding substrate.

According to the present invention, the piezoelectric bodies are formed by transferring the piezoelectric material filled in the recess sections of the molding substrate, onto the diaphragm. Consequently, there is no irregularity in the thickness of the piezoelectric bodies. Furthermore, the molding substrate can be reused, and hence the cost of manufacturing the liquid ejection head can be reduced.

Preferably, the first green sheet is provided with a first electrode formed on a surface thereof; the first green sheet is arranged on the molding substrate in such a manner that the surface of the first green sheet on which the first electrode is formed is adjacent to the molding substrate in the lamination step, and the lamination step further comprises the step of arranging on the first green sheet a second green sheet to form a flow channel plate constituting walls of the pressure chambers; and the method further comprises, after the separating step, the step of performing a second heating step of heating at least the piezoelectric material, the first green sheet and the second green sheet, at a temperature higher than that of the first heating step.

According to this, since the diaphragm and the flow channel plate are formed by green sheets, it becomes unnecessary to bond the green sheets by means of adhesive, and the bonding reliability is improved.

Preferably, the method further comprises, before the piezoelectric material filling step, the step of filling a binder resin into the recess sections. According to this, since the binder resin filled in the recess sections evaporates in the first heating step, then the separability of the molding substrate is improved.

Preferably, the method further comprises, before the piezoelectric material filling step, the step of filling second electrodes into the recess sections. According to this, since it is possible to calcine the second electrodes together with the piezoelectric material, the process of manufacturing the liquid ejection head is simplified.

Preferably, the method further comprises, before the piezoelectric material filling step, the step of filling a binder resin into the recess sections and then filling second electrodes into the recess sections. According to this, the separability of the molding substrate is improved, and also the process of manufacturing a liquid ejection head is simplified.

Preferably, the recess sections are provided with vents. According to this, since the binder resin evaporates through the vents, the separability of the molding substrate is further improved.

Preferably, the recess sections have uneven bottom faces. According to this, it is possible to form piezoelectric bodies of a plurality of shapes on the diaphragm.

According to the present invention, the piezoelectric bodies are formed by transferring the piezoelectric material filled into the recess sections of a molding substrate, onto the diaphragm. Consequently, there is no irregularity in the thickness of the piezoelectric bodies. Furthermore, the molding substrate can be reused, and hence the cost of manufacturing the liquid ejection head can be reduced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

First Embodiment

Figure 1:
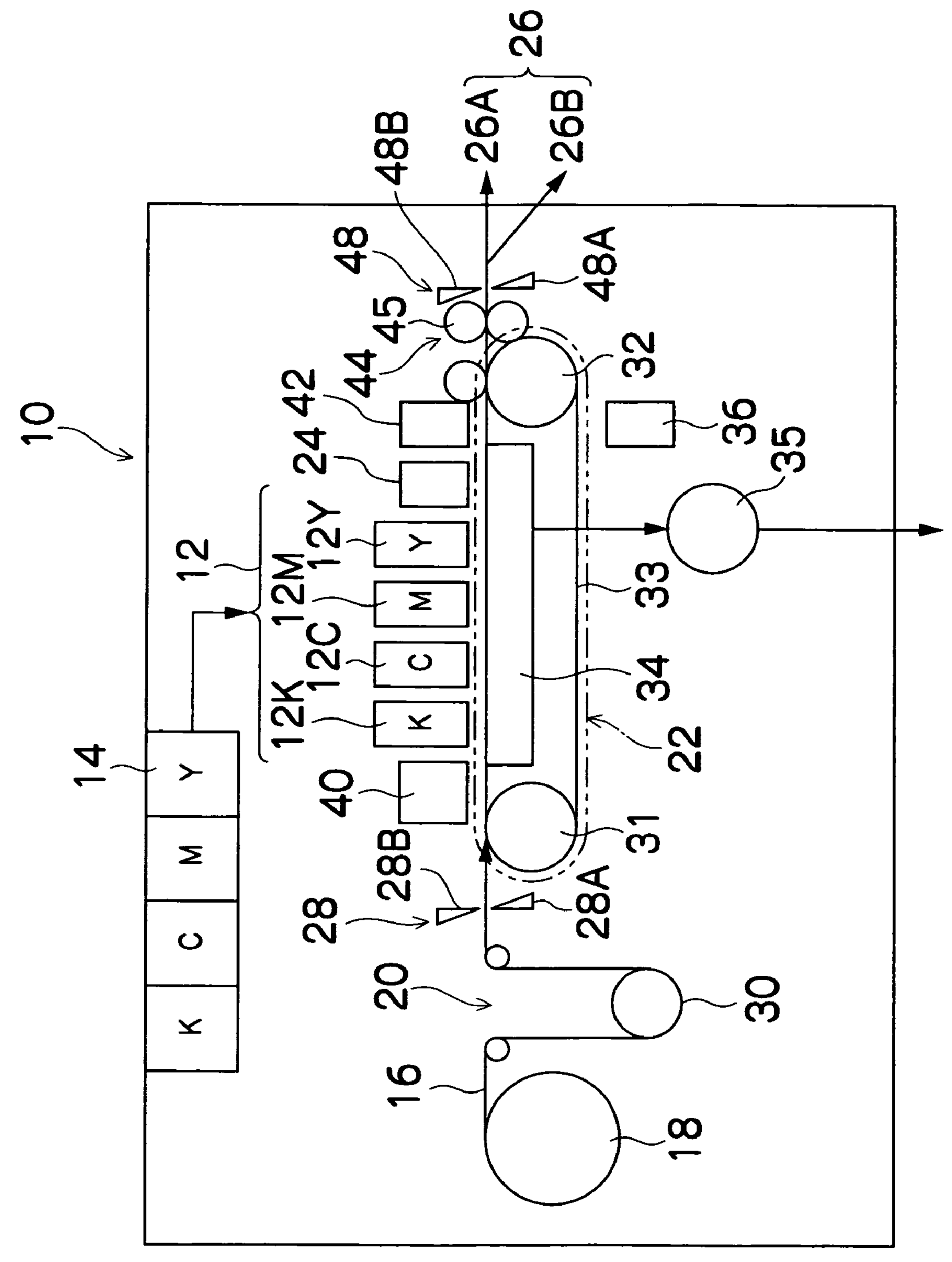
FIG. 1 is a general schematic drawing of an example of an inkjet recording apparatus.

FIG. 1 is a general schematic drawing of an inkjet recording apparatus having a print head (liquid ejection head) to which an embodiment of the present invention is applied. As shown in FIG. 1, the inkjet recording apparatus 10 comprises: a print unit 12 having a plurality of print heads 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16 supplied from the paper supply unit 18; a suction belt conveyance unit 22 disposed facing the nozzle face (ink droplet ejection face) of the print unit 12, for conveying the recording paper 16 while keeping the recording paper 16 flat; a print determination unit 24 for reading the printed result produced by the print unit 12; and a paper output unit 26 for outputting image-printed recording paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 1, and the roll paper is cut to a desired size by the cutter 28. The cutter 28 has a stationary blade 28A, of which length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and a negative pressure is generated by sucking air from the suction chamber 34 by means of a fan 35, thereby the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

The print unit 12 is a so-called "full line head" in which a line head having a length corresponding to the maximum paper width is arranged in a direction (main scanning direction) that is perpendicular to the paper conveyance direction (sub scanning direction).

More specifically, the print heads 12K, 12C, 12M and 12Y forming the print unit 12 are constituted by line heads in which a plurality of ink ejection ports (nozzles) are arranged through a length exceeding at least one edge of the maximum size recording paper 16 intended for use with the inkjet recording apparatus 10.

The print heads 12K, 12C, 12M, and 12Y are arranged in the order of black (K), cyan (C), magenta (M), and yellow (Y) from the upstream side (left side in FIG. 1), along the conveyance direction of the recording paper 16 (paper conveyance direction). A color image can be formed on the recording paper 16 by ejecting the inks from the print heads 12K, 12C, 12M, and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relative to each other in the paper conveyance direction (sub-scanning direction) just once (in other words, by means of a single sub-scan). Higher-speed printing is thereby made possible and productivity can be improved in comparison with a shuttle type head configuration in which a print head moves reciprocally in the direction (main scanning direction) which is perpendicular to the paper conveyance direction.

Here, the terms main scanning direction and sub-scanning direction are used in the following senses. More specifically, in a full-line head comprising rows of nozzles that have a length corresponding to the entire width of the recording paper, "main scanning" is defined as printing one line (a line formed of a row of dots, or a line formed of a plurality of rows of dots) in the breadthways direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other. The direction in which sub-scanning is performed is called the sub-scanning direction. Consequently, the conveyance direction of the reference point is the sub-scanning direction and the direction perpendicular to same is called the main scanning direction.

Although a configuration with the KCMY four standard colors is described in the present embodiment, the combinations of the ink colors and the number of colors are not limited to these, and light and/or dark inks can be added as required. For example, a configuration is possible in which print heads for ejecting light-colored inks such as light cyan and light magenta are added.

As shown in FIG. 1, the ink storing and loading unit 14 has ink tanks for storing the inks of the colors corresponding to the respective print heads 12K, 12C, 12M, and 12Y, and the respective tanks are connected to the print heads 12K, 12C, 12M, and 12Y by means of channels (not shown). The ink storing and loading unit 14 has a warning device (for example, a display device, an alarm sound generator, or the like) for warning when the remaining amount of any ink is low, and has a mechanism for preventing loading errors among the colors.

The print determination unit 24 has an image sensor (line sensor and the like) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown, the paper output unit 26A for the target prints is provided with a sorter for collecting prints according to print orders.

Next, the structure of the print head will be described. The print heads 12K, 12C, 12M and 12Y of the respective ink colors have the same structure, and a reference numeral 50 is hereinafter designated to any of the print heads.

Figure 2:
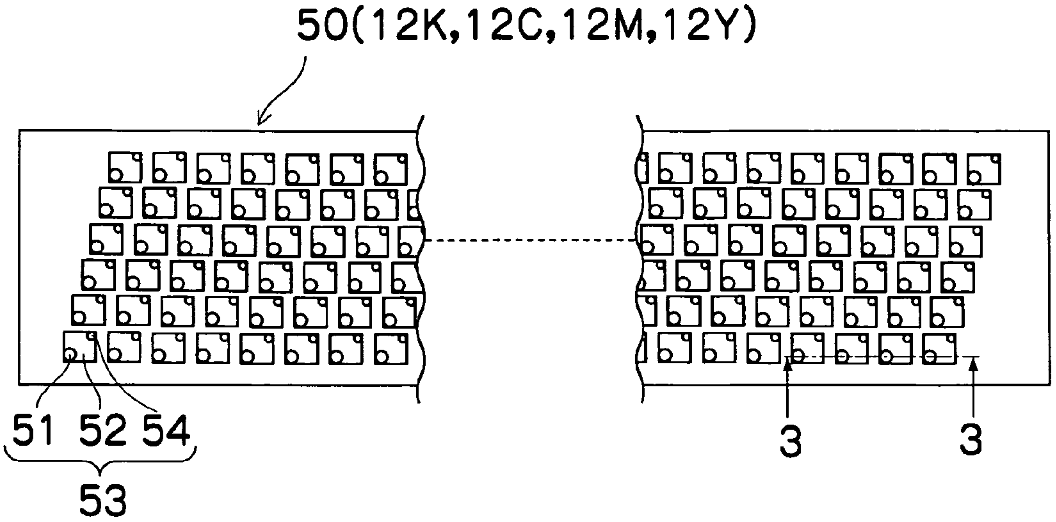
FIG. 2 is a plan perspective diagram showing an example of the structure of a print head.

FIG. 2 is a plan view perspective diagram showing an example of the structure of the print head 50. As shown in FIG. 2, the print head 50 according to the present embodiment has a structure in which a plurality of ink chamber units 53, each including a nozzle 51 which ejects ink droplets, a pressure chamber 52 corresponding to the nozzle 51, and the like, are two-dimensionally disposed in the form of a staggered matrix, and hence the effective nozzle interval (the projected nozzle pitch) as projected in the lengthwise direction of the print head 50 (the direction perpendicular to the paper conveyance direction) is reduced (high nozzle density is achieved).

The pressure chamber 52 provided corresponding to each of the nozzles 51 is approximately square-shaped in plan view, and the nozzle 51 and an ink supply port 54 are arranged at corners of the pressure chamber 52 on a diagonal of the pressure chamber 52.

Figure 3:
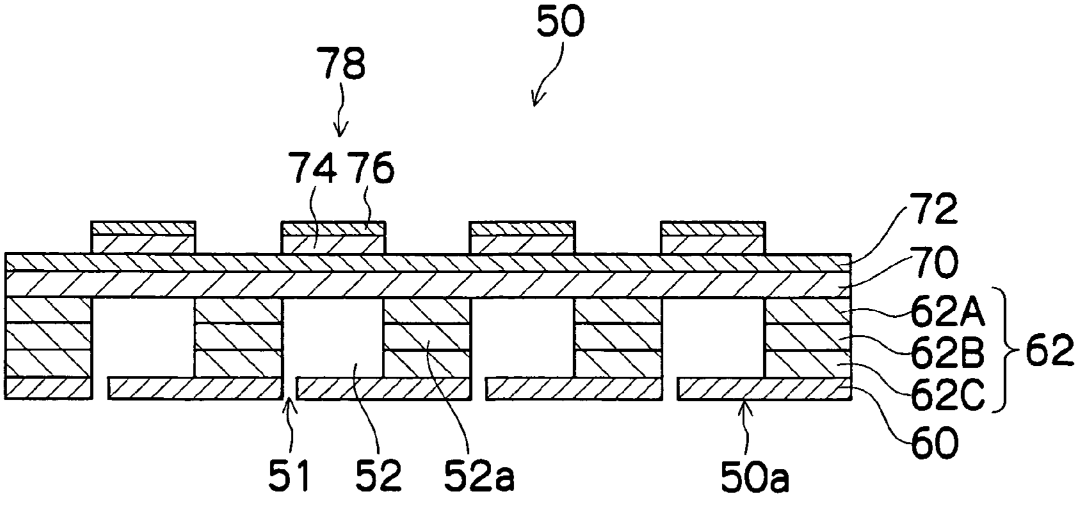
FIG. 3 is a cross-sectional diagram along line 3-3 in FIG. 2.

FIG. 3 is a cross-sectional diagram along line 3-3 in FIG. 2. As shown in FIG. 3, the print head 50 has a structure in which a plurality of plate members are arranged to overlap each other. More specifically, a nozzle plate 60 formed with the nozzles 51, flow channel plates 62 (62A, 62B and 62C) constituting side walls 52*a* of the pressure chambers 52, and a diaphragm 70 are arranged to overlap sequentially from the side of the ink ejection surface (nozzle surface) 50*a*.

The nozzles 51 are connected to the pressure chambers 52. Ink is supplied to the pressure chambers 52 from a common liquid chamber (not shown) through the ink supply ports 54 formed at the ends of the pressure chambers 52 as shown in FIG. 2. Ink supplied from an ink tank (not shown) forming an ink source is accumulated in the common liquid chamber.

The diaphragm 70 forms the upper surfaces of the plurality of pressure chambers 52. A common electrode 72 (first electrode) is formed on the whole surface of the diaphragm 70 reverse to the surface adjacent to the pressure chambers 52. Piezoelectric bodies 74 are formed on the common electrode 72 at positions corresponding to the pressure chambers 52 on the diaphragm 70. Individual electrodes 76 (second electrodes) are respectively formed on the piezoelectric bodies 74. The electrode material of the common electrode 72 and the individual electrodes 76 is a metal, such as gold, silver, copper, nickel, platinum, and the like. The piezoelectric material of the piezoelectric bodies 74 is lead zirconate titanate, barium titanate, or the like.

The piezoelectric elements 78 according to the present embodiment are made of the piezoelectric bodies 74 arranged between the common electrode 72 and the individual electrodes 76, and thereby form pressure generating devices for the ink accumulated in the pressure chambers 52. In the present embodiment, a composition is adopted in which the common electrode 72 is disposed on the whole surface of the diaphragm 70, but the embodiment is not limited to this, and a composition may also be adopted in which the common electrode 72 is only disposed in positions corresponding to the pressure chambers 52.

In the print head 50 having a structure of this kind, when a drive voltage is applied to the piezoelectric element 78 from a drive circuit (not shown) in order to eject ink, then the piezoelectric body 74 is deformed by a lateral piezoelectric effect, and a portion of the diaphragm 70 corresponding to the piezoelectric body 74 is bent toward the pressure chamber 52. Consequently, the volume of the pressure chamber 52 is reduced, the ink accommodated inside the pressure chamber 52 is pressurized, and an ink droplet is ejected from the nozzle 51 connected to the pressure chamber 52. After ejecting ink, when the voltage applied to the piezoelectric element 78 returns to its original value, the piezoelectric body 74 and the diaphragm 70 return to their original state, and ink is supplied to the pressure chamber 52 from the common liquid chamber through the ink supply port 54.

Next, a method of manufacturing the print head 50 will be described. FIGS. 4A to 4I are illustrative diagrams showing steps for manufacturing the print head 50 according to the first embodiment of the present invention. In order to simplify the illustration, the print head 50 shown in FIG. 3 is depicted upside-down in FIGS. 4A to 4I, in such a manner that the ink ejection surface 50*a* is facing upward in FIG. 4I (the same applies to FIG. 5A to FIG. 9).

Figure 4A:
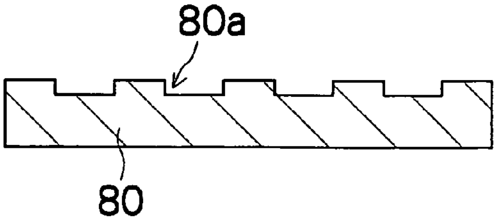
FIGS. 4A to 4I are illustrative diagrams showing steps for manufacturing a print head according to a first embodiment of the present invention.

Firstly, as a step of manufacturing a molding substrate shown in FIG. 4A, a molding substrate 80 is fabricated by processing recess sections 80*a* corresponding to the shape of the piezoelectric bodies 74 (see FIG. 3) by dry etching (e.g., reactive ion etching (RIE)) in a substrate made of silicon (Si) or glass. The planar structure of the molding substrate 80 is not shown in particular, but similarly to the pressure chambers 52 in the print head 50 shown in FIG. 2, they have a structure in which the recess sections 80*a* having an approximately square shape are disposed in a staggered matrix configuration (two-dimensional configuration). The depth of the recess sections 80*a* is substantially the same as the thickness of the piezoelectric bodies 74, namely, approximately 10 μm.

Figure 4B:
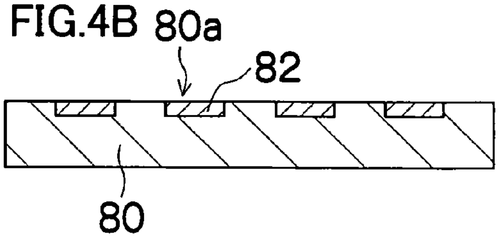

Next, in a filling step shown in FIG. 4B, piezoelectric material 82 in the form of a slurry is filled into the recess sections 80*a* in the molding substrate 80, by screen printing or by means of a dispenser.

Figure 4C:
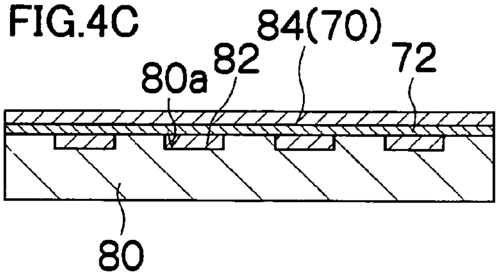

Next, in a first lamination step shown in FIG. 4C, a green sheet 84 of ceramic ($ZrO_2$) which corresponds to the diaphragm 70 (see FIG. 3) is arranged on the molding substrate 80, in such a manner that the green sheet 84 covers the recess sections 80*a* filled with the piezoelectric material 82. At this time, the common electrode 72 has been formed by screen printing or sputtering on the whole surface of the green sheet 84, and the green sheet 84 is arranged in such a manner that the side of the green sheet 84 on which the common electrode 72 is formed is the side adjacent to the molding substrate 80.

Figure 4D:
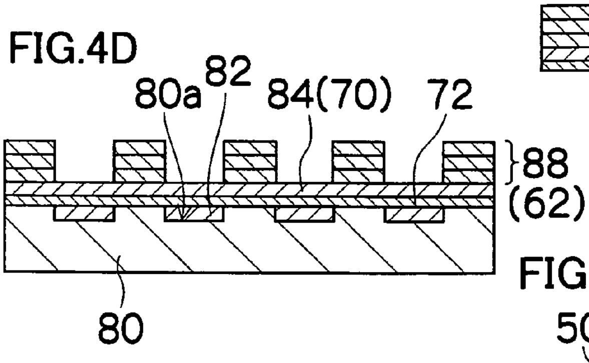

Next, in a second lamination step shown in FIG. 4D, a plurality of green sheets 88 of ceramic ($ZrO_2$) corresponding to the flow channel plates 62 (see FIG. 3) are arranged onto the green sheet 84.

Figure 4E:
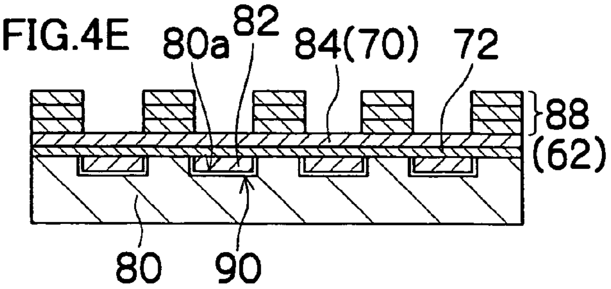

Next, in a binder removing step (first heating step) shown in FIG. 4E, the molding substrate 80 on which the green sheets 84 and 88 have been arranged is heated to approximately 400° C. Thereby, the piezoelectric material 82 filled in the recess sections 80*a* is heated, the binder resin contained in the piezoelectric material 82 evaporates, and therefore, the piezoelectric material 82 contracts and voids 90 are formed in the recess sections 80*a*.

Figure 4F:
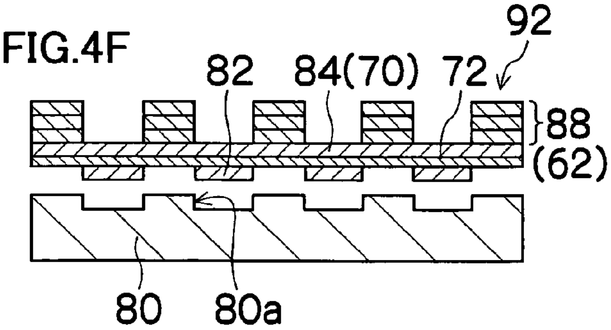

Next, in a separation step shown in FIG. 4F, the molding substrate 80 is separated from the laminated body 92 comprising the green sheets 84 and 88. At this time, the piezoelectric material 82 can be separated readily from the recess sections 80*a*, in such a manner that the piezoelectric material 82 filled in the recess sections 80*a* is transferred to the surface of the common electrode 72, because of the voids 90 formed in the recess sections 80*a* in the binder removing step, and hence the separability of the molding substrate 80 is good.

Figure 4G:
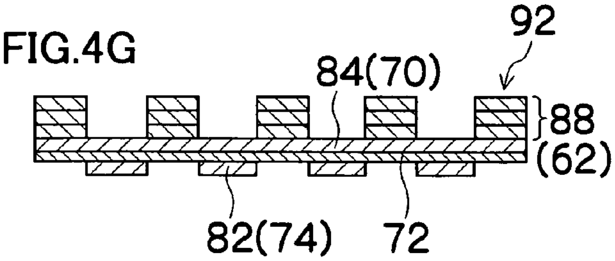

Next, in a calcining step (second heating step) shown in FIG. 4G, the laminated body 92 is calcined at approximately 1200° C. while being pressurizing the direction of lamination. Accordingly, the diaphragm 70 and the flow channel plates 62, which are formed by the calcined green sheets 84 and 88, are bonded together without using adhesive. After calcining, the piezoelectric material 82 corresponds to the piezoelectric bodies 74.

Figure 4H:
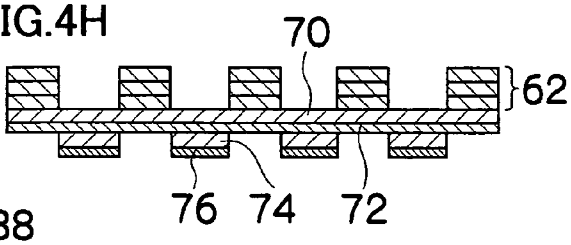

Next, in an individual electrode forming step shown in FIG. 4H, the individual electrodes 76 are screen printed onto the surface of the piezoelectric bodies 74 reverse to the surface adjacent to the common electrode 72, and are then calcined.

Figure 4I:
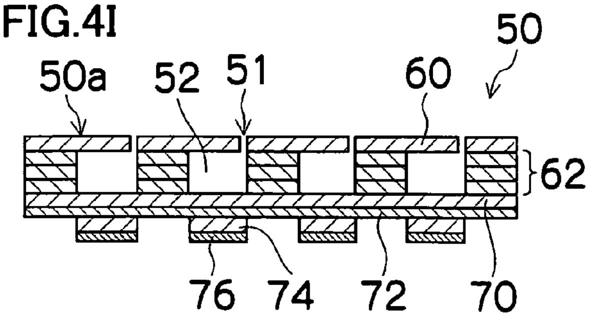

Finally, in a nozzle plate bonding step shown in FIG. 4I, the nozzle plate 60 formed by a commonly known method is bonded using an adhesive, or the like, onto the surface of the flow channel plates 62 reverse to the surface adjacent to the diaphragm 70, while ensuring positional alignment between the nozzles 51 and the pressure chambers 52. Thus, the print head 50 is manufactured.

In the first embodiment, the piezoelectric bodies 74 are formed in such a manner that piezoelectric material 82 that has been filled into recess sections 80*a* in the molding substrate 80 is transferred to the diaphragm 70. Consequently, there is no irregularity in the thickness of the piezoelectric bodies 74. Furthermore, by using the molding substrate 80, handling is simplified and it is possible to form thin film piezoelectric bodies readily.

Moreover, in the first embodiment, since it is possible to reuse the molding substrate 80, the step of manufacturing the molding substrate does not have to be repeated, and hence the manufacturing costs of the print head 50 can be reduced.

Furthermore, in the first embodiment, by forming the diaphragm 70 and the flow channel plates 62 from ceramic green sheets, it becomes unnecessary to bond these members together by using adhesive, and bonding reliability is improved.

Second Embodiment

Figure 5A:
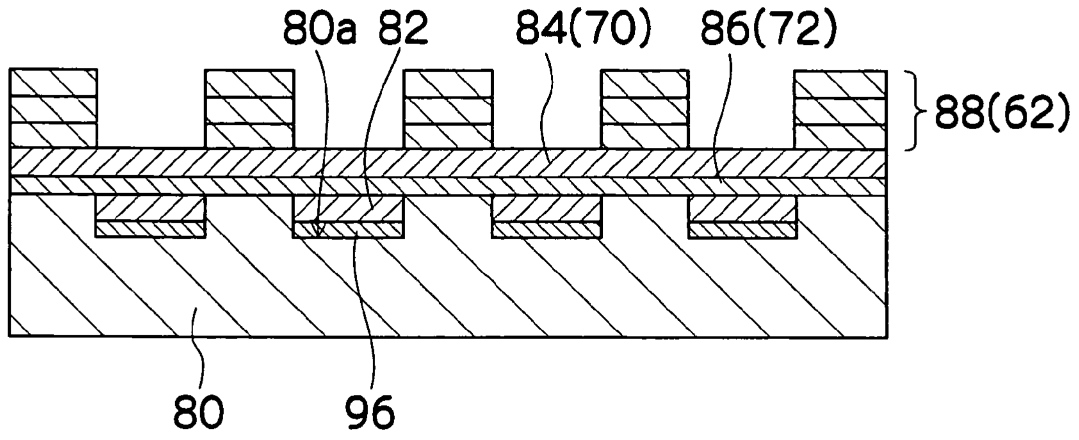
FIGS. 5A and 5B are illustrative diagrams showing a portion of steps for manufacturing a print head according to a second embodiment.
Figure 5B:
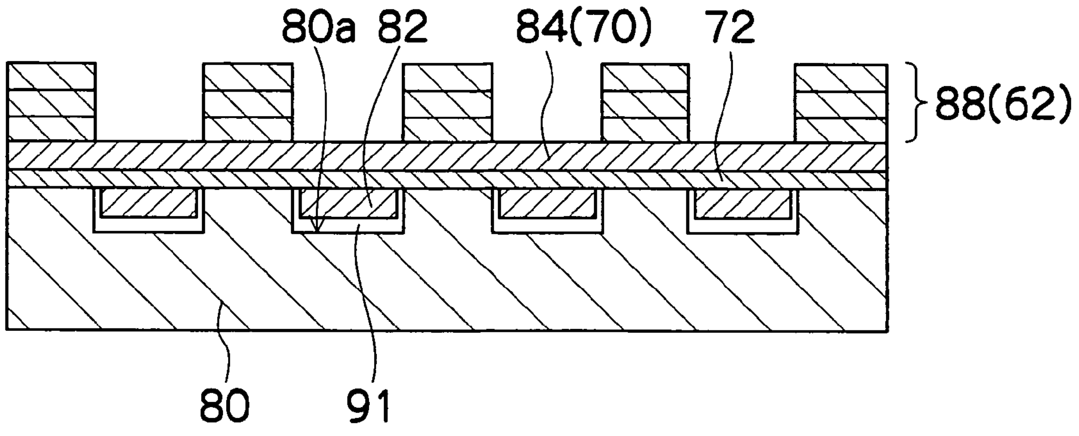

Next, a second embodiment of the present invention will be described. FIGS. 5A and 5B are illustrative diagrams showing a portion of steps for manufacturing the print head 50 according to the second embodiment. FIGS. 5A and 5B correspond respectively to FIGS. 4D and 4E in the first embodiment.

In the second embodiment, in contrast to the first embodiment, a binder resin 96 is filled into the recess sections 80*a* in the molding substrate 80, before filling the piezoelectric material 82 into same as shown in FIG. 5A. The material of the binder resin 96 is similar to the binder material used for the green sheet and printing paste, and an acrylic resin, polyurethane resin, nylon-type resin, teflon-type resin, silicone resin, or the like, is used. Similarly to the first embodiment, the green sheets 84 and 88 are arranged onto the molding substrate 80 so as to cover the recess sections 80*a*.

Next, in a binder removal step shown in FIG. 5B, the molding substrate 80 on which the green sheets 84 and 88 have been arranged is calcined at approximately 400° C. At this time, the binder resin contained in the piezoelectric material 82 evaporates similarly to the first embodiment, and therefore the piezoelectric material 82 contracts, and furthermore, since the binder resin 96 filled in the recess sections 80*a* before the piezoelectric material 82 also evaporates, larger voids 91 are formed in the recess sections 80*a* in comparison with the first embodiment. These large voids 91 improve the separability of the molding substrate 80. The subsequent steps are the same as those of the first embodiment, and further description thereof is omitted here.

Third Embodiment

Figure 6:
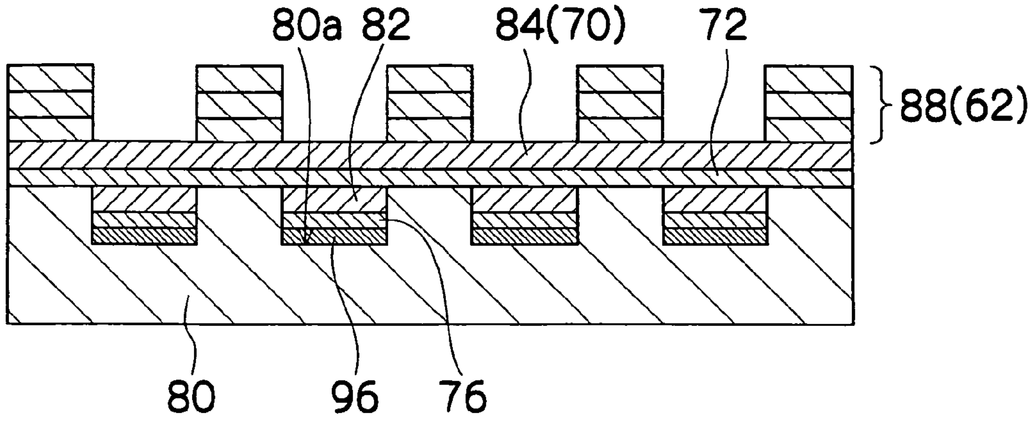
FIG. 6 is an illustrative diagram showing a portion of steps for manufacturing a print head according to a third embodiment.

Next, a third embodiment of the present invention will be described. FIG. 6 is an illustrative diagram showing a portion of steps for manufacturing the print head 50 according to the third embodiment, and corresponds to FIG. 4D in the first embodiment.

In the third embodiment, as shown in FIG. 6, the binder resin 96 and the individual electrodes 76 are filled into the recess sections 80*a* of the molding substrate 80 before filling the piezoelectric material 82, and the green sheets 84 and 88 are then arranged onto the molding substrate 80 so as to cover the recess sections 80*a*. The subsequent steps are similar to those in the first and second embodiments, with the exception of the step of forming the individual electrodes.

By filling the individual electrodes 76 together with the piezoelectric material 82, the individual electrodes 76 are calcined simultaneously with the green sheets 84 and 88 and the piezoelectric material 82 in the calcining step, and therefore, the step for forming the individual electrodes becomes unnecessary. In other words, the number of calcining steps is reduced by one compared to the first and second embodiments, and hence the process of manufacturing the print head 50 is simplified.

Furthermore, by filling the binder resin 96 into the recess sections 80*a*, the separability of the molding substrate 80 is improved, similarly to the second embodiment.

Fourth Embodiment

Figure 7:
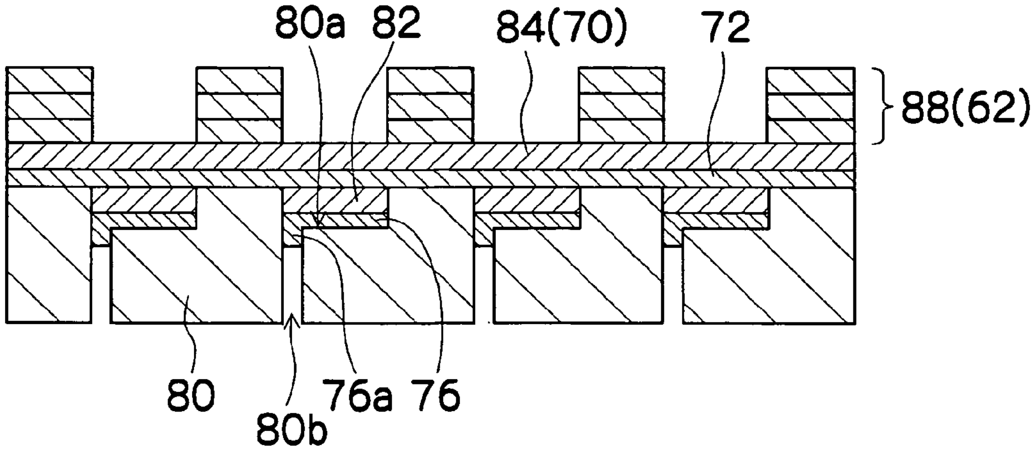
FIG. 7 is an illustrative diagram showing a portion of steps for manufacturing a print head according to a fourth embodiment.

Next, a fourth embodiment of the present invention will be described. FIG. 7 is an illustrative diagram showing a portion of steps for manufacturing the print head 50 according to the fourth embodiment, and corresponds to FIG. 4D in the first embodiment.

In the fourth embodiment, vents 80*b* are formed in the recess sections 80*a* of the molding substrate 80. Each of the vents 80*b* is formed in such a manner that it passes through the molding substrate 80 from an end of the bottom face of each of the recess sections 80*a*. The individual electrodes 76 are filled into the recess sections 80*a* formed with the vents 80*b*, before filling the piezoelectric material 82. At this time, the individual electrodes 76 enter slightly into the vents 80*b*, and hence bump sections 76*a* are formed in the individual electrodes 76. The subsequent steps are similar to those of the third embodiment.

In this way, in the fourth embodiment, similar to the third embodiment, by filling the individual electrodes 76 into the recess sections 80*a*, the individual electrodes 76 are calcined simultaneously with the green sheets 84 and 88 and the piezoelectric material 82 in the calcining step, similarly to the third embodiment, and furthermore, the bump sections 76*a* are formed simultaneously on the individual electrodes 76. Therefore, the manufacturing process of the print head 50 is simplified yet further.

Furthermore, since the vents 80*b* act as evaporation openings for the binder resin contained in the piezoelectric material 82, in the binder removal step, then the voids can be formed readily in the recess sections 80*a* and the separability of the molding substrate 80 is improved.

Fifth embodiment

Figure 8:
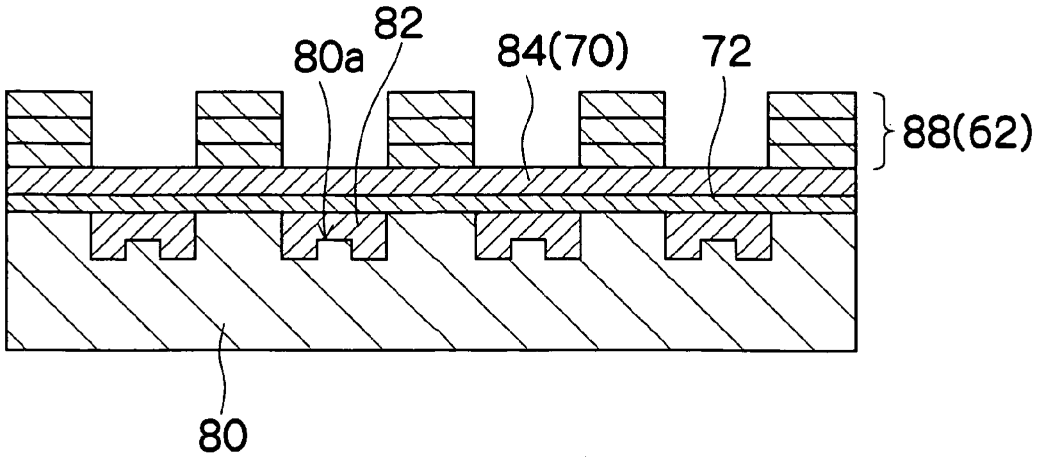
FIG. 8 is an illustrative diagram showing a portion of steps for manufacturing a print head according to a fifth embodiment.

Next, a fifth embodiment of the present invention will be described. FIG. 8 is an illustrative diagram showing a portion of steps for manufacturing the print head 50 according to the fifth embodiment, and corresponds to FIG. 4D in the first embodiment.

In the fifth embodiment, the bottom faces of the recess sections 80*a* of the molding substrate 80 are formed with an uneven shape. In other words, the recess sections 80*a* have a plurality of depths, and in the embodiment shown in FIG. 8, the perimeter region of each recess section 80*a* has a greater depth than the central region thereof. In this case, the piezoelectric bodies having a complex shape can be formed by filling the piezoelectric material 82 into the recess sections 80*a* and carrying out steps similar to those of the first embodiment. Thereby, it is possible to increase the rigidity (and generated pressure) in comparison with the other embodiments, without impairing the displacement volume, and hence the print head 50 having a high ejection force can be manufactured.

Furthermore, similarly to the second and third embodiments, if the binder resin and the individual electrodes are filled into the recess sections 80*a* having uneven shaped bottom faces, before filling the piezoelectric material 82, then it is possible to achieve good separability of the molding substrate 80 and simplification of the manufacturing process. Moreover, if the vents are provided in the recess sections 80*a* similarly to the fourth embodiment, then the separability of the molding substrate 80 can be improved yet further.

Figure 9:
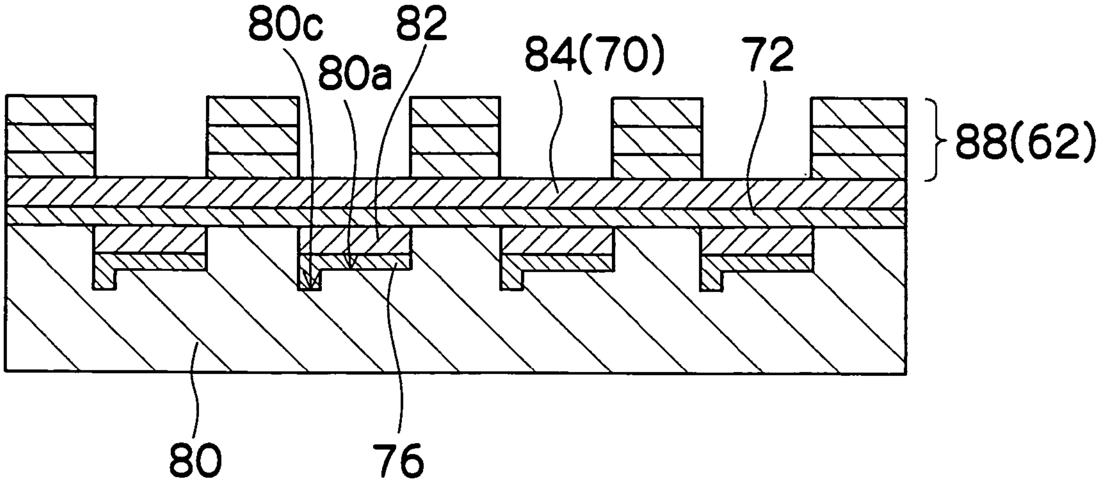
FIG. 9 is an illustrative diagram showing a portion of steps for manufacturing a print head according to a modification of the fifth embodiment.

FIG. 9 is a modification example of the fifth embodiment. In FIG. 9, an even deeper recess section 80*c* is formed at one end portion of the bottom face of each of the recess sections 80*a* in the molding substrate 80. The individual electrodes 76 are filled into the recess sections 80*a* before filling the piezoelectric material 82. By using the molding substrate 80 of this kind, it is possible to simultaneously form the bump sections 76*a* on the individual electrodes 76, in a similar fashion to the fourth embodiment.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a liquid ejection head in which piezoelectric bodies are formed on a diaphragm which constitutes walls of a plurality of pressure chambers, the method comprising the steps of:

filling piezoelectric material into a plurality of recess sections of a molding substrate formed with the plurality of recess sections so as to correspond to the pressure chambers;

then performing a lamination step of arranging a first green sheet that is to form the diaphragm onto the molding substrate in such a manner that the first green sheet covers the recess sections filled with the piezoelectric material;

then forming piezoelectric bodies on an opposite side of the diaphragm from the plurality of pressure chambers;

then performing a first heating step of heating the piezoelectric material filled in the recess sections; and then separating the piezoelectric material from the molding substrate.

2. The method as defined in claim 1, wherein:

the first green sheet is provided with a first electrode formed on a surface thereof;

the first green sheet is arranged on the molding substrate in such a manner that the surface of the first green sheet on which the first electrode is formed is adjacent to the molding substrate in the lamination step, and the lamination step further comprises the step of arranging on the first green sheet a second green sheet to form a flow channel plate constituting walls of the pressure chambers; and the method further comprises, after the separating step, the step of performing a second heating step of heating at least the piezoelectric material, the first green sheet and the second green sheet, at a temperature higher than that of the first heating step.

3. The method as defined in claim 1, further comprising, before the piezoelectric material filling step, the step of filling a binder resin into the recess sections.

4. The method as defined in claim 1, further comprising, before the piezoelectric material filling step, the step of filling second electrodes into the recess sections.

5. The method as defined in claim 1, further comprising, before the piezoelectric material filling step, the step of filling a binder resin into the recess sections and then filling second electrodes into the recess sections.

6. The method as defined in claim 1, wherein the recess sections are provided with vents.

7. The method as defined in claim 1, wherein the recess sections have uneven bottom faces.

8. The method as defined in claim 1, wherein the piezoelectric material filled in the recess sections forms the piezoelectric bodies.

9. The method as defined in claim 1, wherein, after the first heating step is performed, the piezoelectric material is separated from the molding substrate.

10. A method of manufacturing a liquid ejection head in which piezoelectric bodies are formed on a diaphragm which constitutes walls of a plurality of pressure chambers, the method comprising:

a filling step of filling piezoelectric material into a plurality of recess sections of a molding substrate formed with the plurality of recess sections so as to correspond to the pressure chambers;

a lamination step of arranging a first green sheet that is to form the diaphragm onto the molding substrate in such a manner that the first green sheet covers the recess sections filled with the piezoelectric material;

a step of forming piezoelectric bodies on an opposite side of the diaphragm from the plurality of pressure chambers;

a first heating step of heating the piezoelectric material filled in the recess sections in such a manner that the piezoelectric material contracts to form voids in the recess sections, after the lamination step is performed; and a separation step of separating the piezoelectric material from the molding substrate after the first heating step is performed.

* * * * *